United States Patent [19]

Cour

[11] 4,338,045
[45] Jul. 6, 1982

[54] METHOD AND APPARATUS FOR ANCHORING A LINE, SUCH AS A PIPELINE, TO A SUPPORT, AND IN PARTICULAR A SEA-BED

[75] Inventor: Francis R. Cour, Maisons-Lafitte, France

[73] Assignee: Coyne et Bellier, Bureau d'Ingenieurs Conseils, Paris, France

[21] Appl. No.: 151,635

[22] Filed: May 20, 1980

[30] Foreign Application Priority Data

| May 23, 1979 | [FR] | France | 79 13123 |
| Oct. 29, 1979 | [FR] | France | 79 26736 |
| Nov. 7, 1979 | [FR] | France | 79 27459 |

[51] Int. Cl.³ .................................................. F16L 1/00
[52] U.S. Cl. .................................. 405/172; 138/105; 138/106
[58] Field of Search ................ 405/172; 138/105, 106, 138/107

[56] References Cited

U.S. PATENT DOCUMENTS

| 3,699,690 | 10/1972 | Watter | 138/105 X |
| 3,734,138 | 5/1973 | Brown | 138/106 |
| 3,861,158 | 1/1975 | Swain et al. | 138/106 X |
| 4,023,756 | 5/1977 | Baker | 138/107 X |
| 4,068,488 | 1/1978 | Ball | 138/105 X |

FOREIGN PATENT DOCUMENTS 7113684 12/1971 Netherlands ...................... 405/172

*Primary Examiner*—Ernest R. Purser
*Attorney, Agent, or Firm*—Christel, Bean & Linihan

[57] ABSTRACT

A method of anchoring a line, such as a pipeline, to a support, and in particular a sea-bed, comprises the steps, at each anchoring point, of drilling holes in the support on both sides of the line, bedding piles in these holes, passing at least one saddle clamp around the line, securing the ends of the saddle clamp to the piles, and injecting a filling material, which may be a settable material, into an inflatable body arranged between the line and the saddle clamp.

Devices for carrying out the method are also described.

23 Claims, 19 Drawing Figures

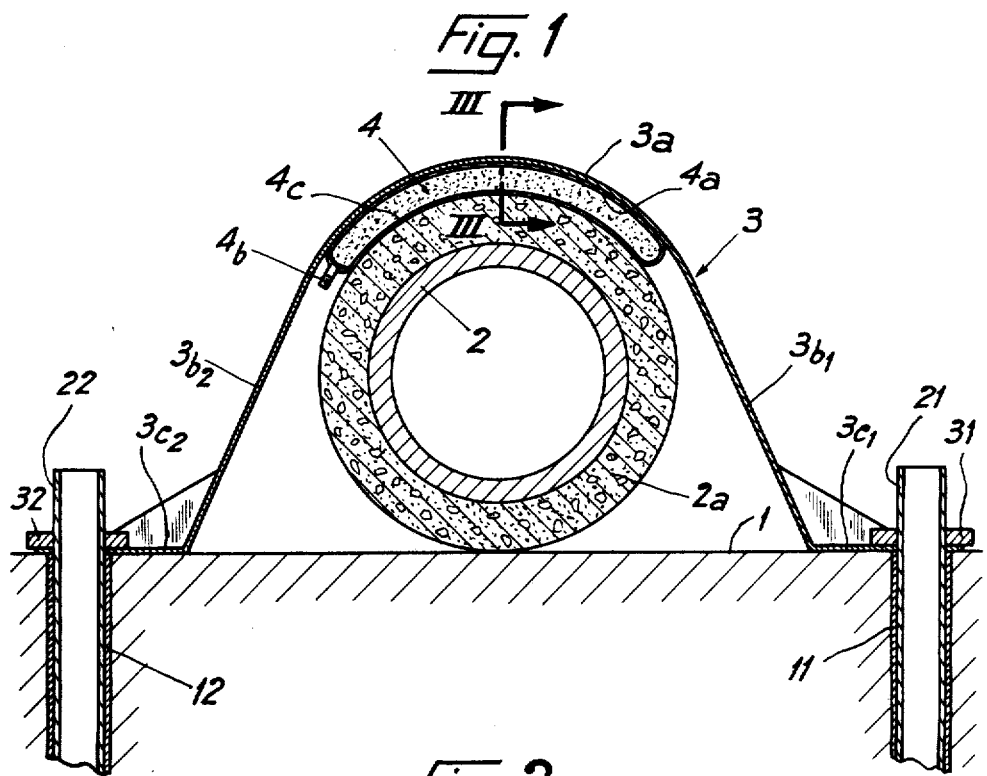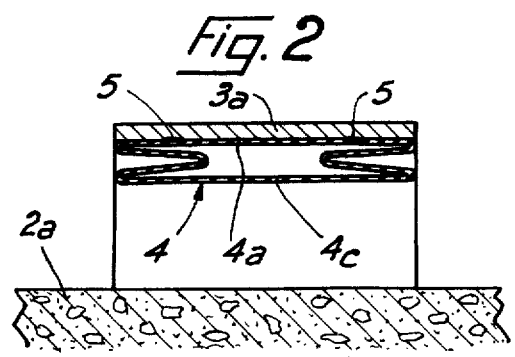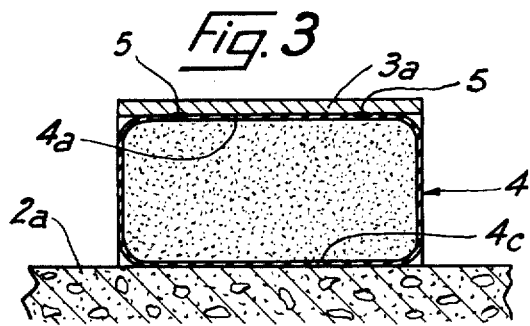

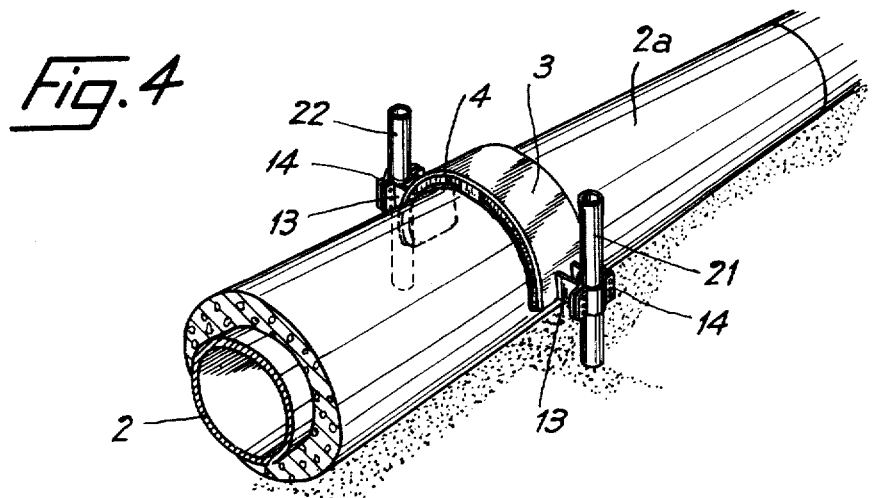
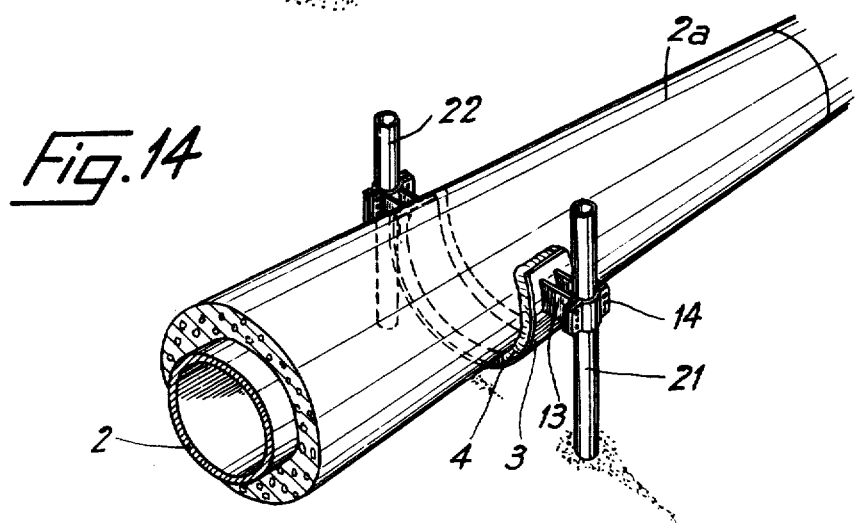
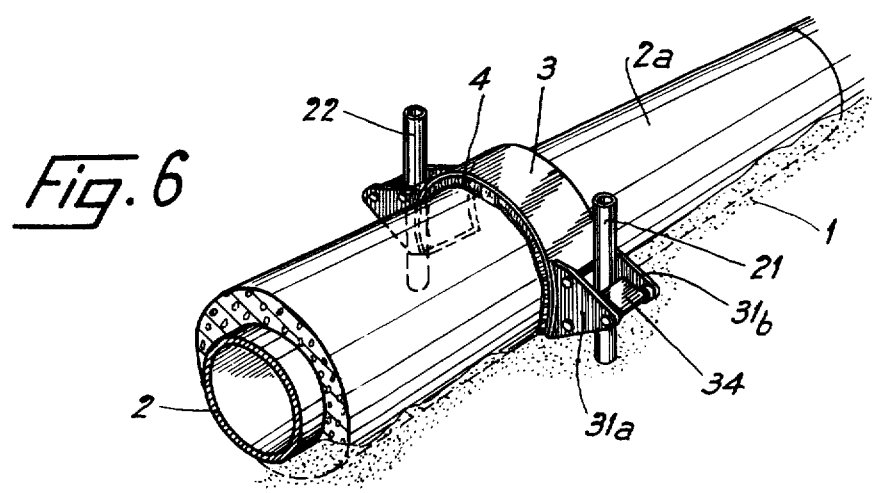

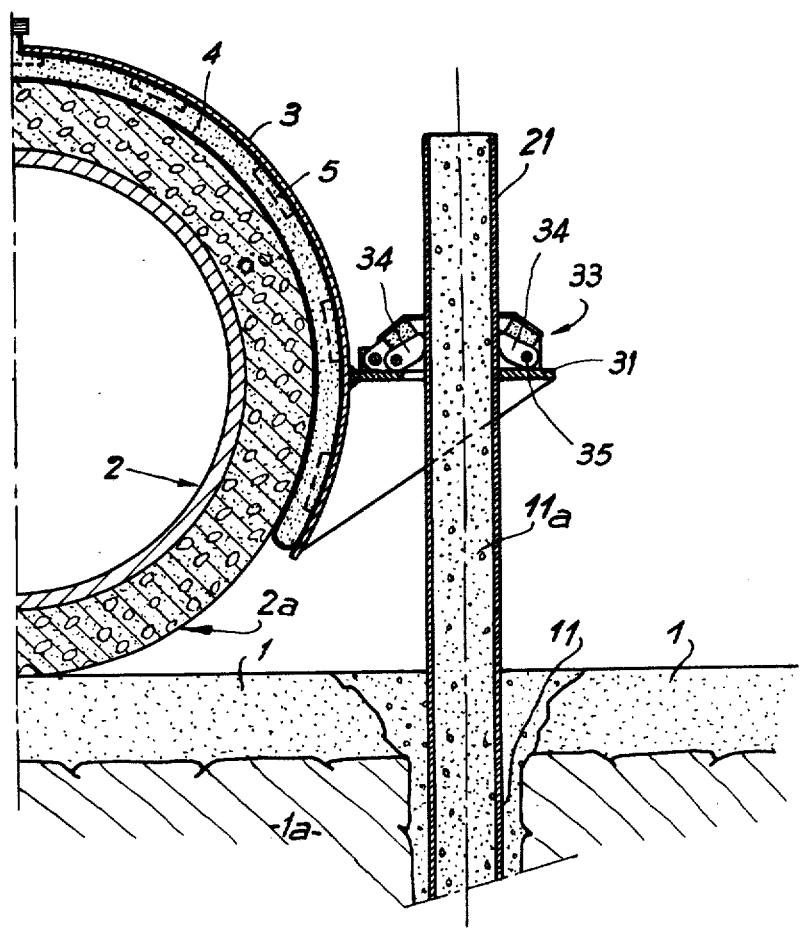

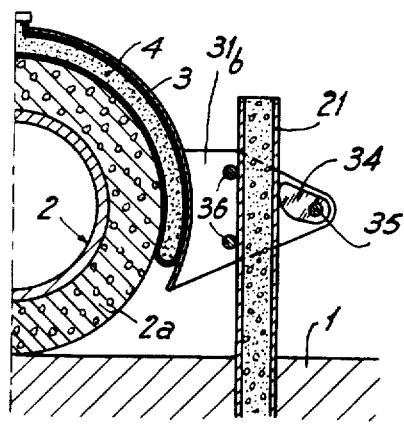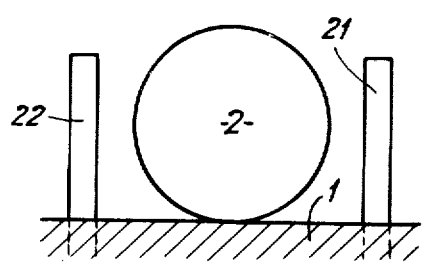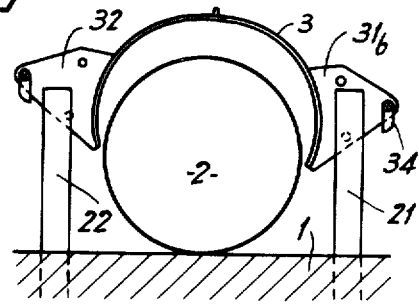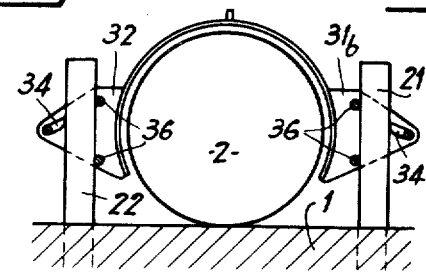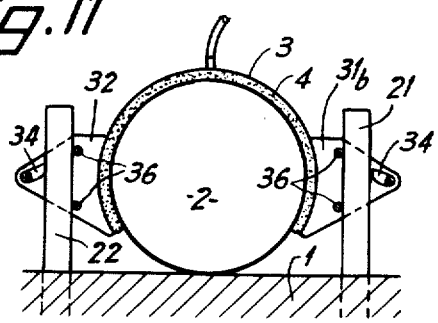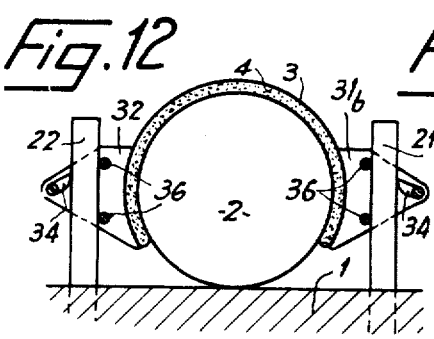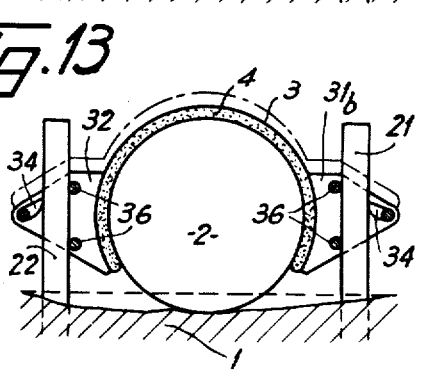

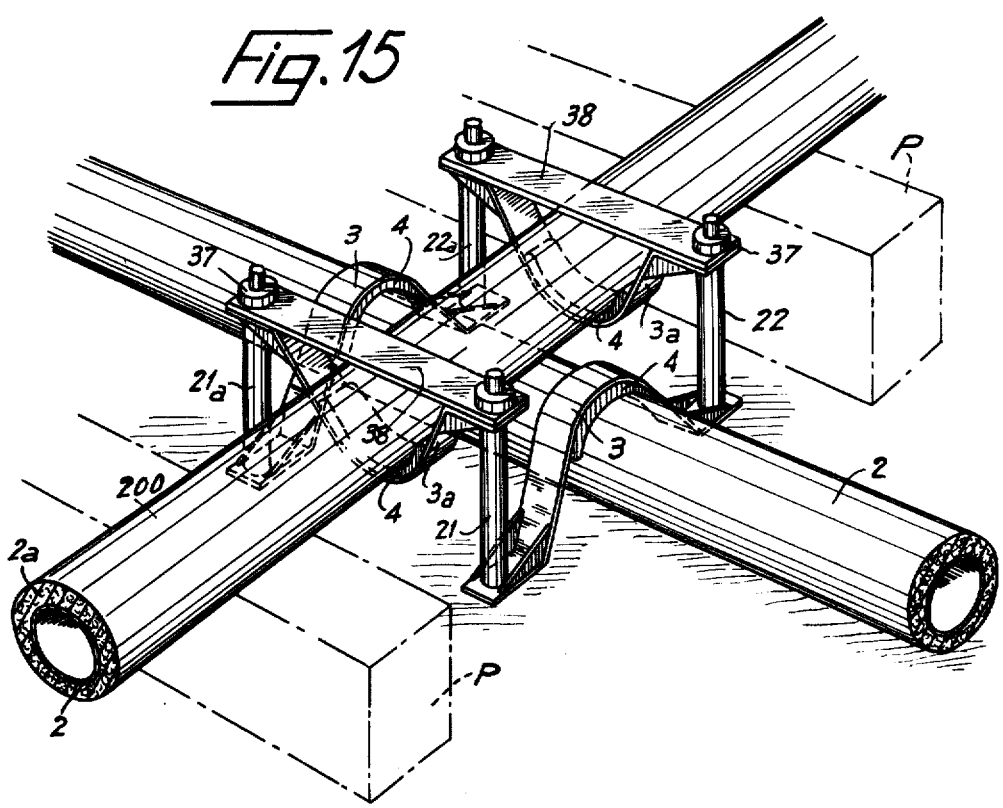
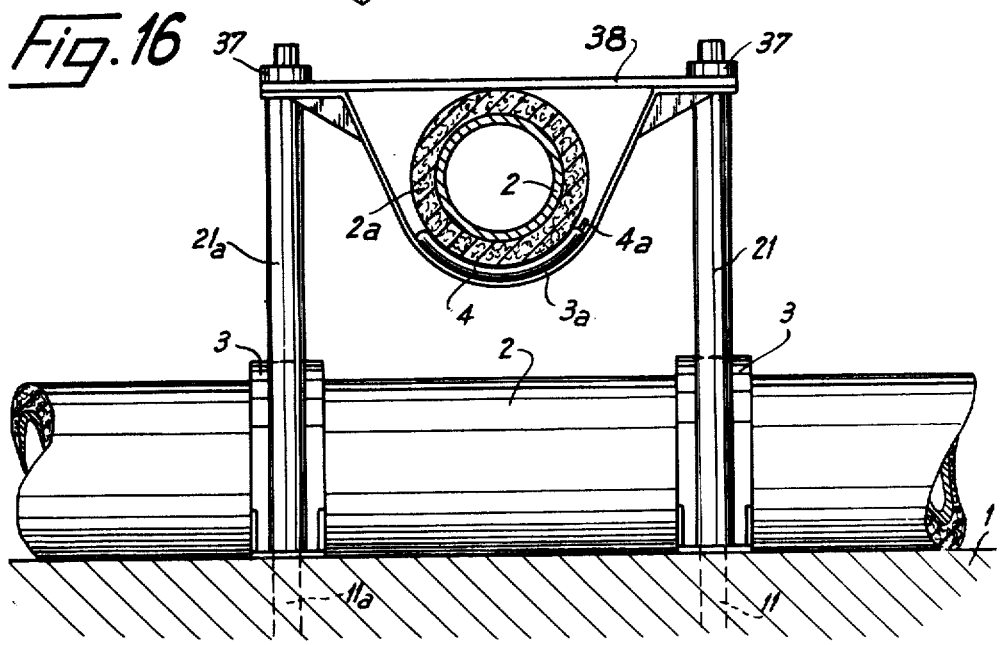

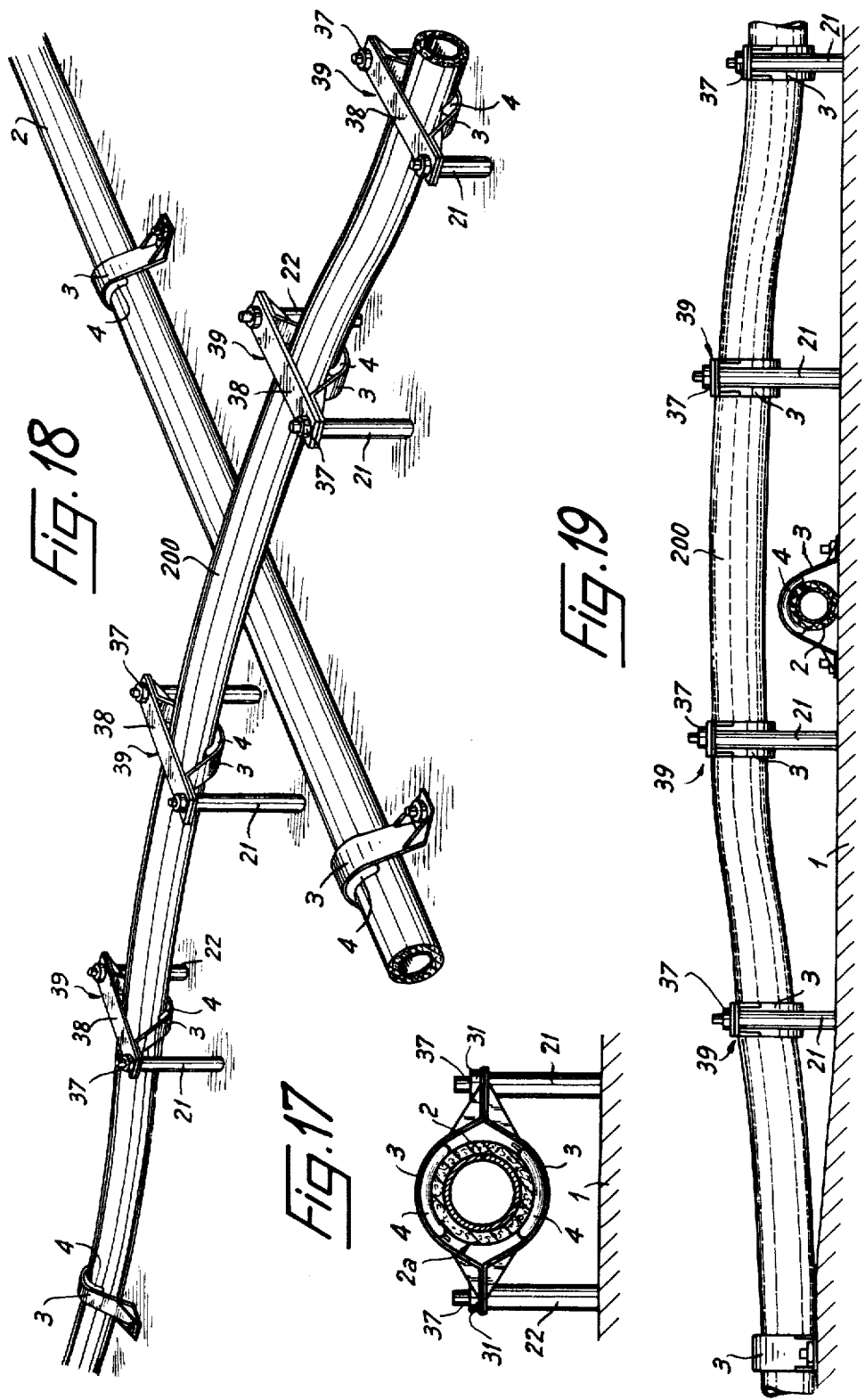

METHOD AND APPARATUS FOR ANCHORING A LINE, SUCH AS A PIPELINE, TO A SUPPORT, AND IN PARTICULAR A SEA-BED

This invention relates to a method of anchoring a line, such as, in particular but not exclusively, a pipeline, to a support, and especially the sea-bed, and to a device for putting the method into practice.

It is known that in certain areas of the world, submerged lines, such as oil-lines and other pipelines, are subjected to considerable currents which may possibly cause displacement thereof, resulting in mechanical stresses inside the lines, which mechanical stresses can give rise to incipient fractures. It is therefore desirable to anchor the lines to the actual sea-bed.

A first difficulty arises from the fact that the work must be carried out under water by personnel with diving equipment. If the depth of the sea does not exceed approximately fifty meters, the personnel undertaking the anchoring operation can be provided with skin diving equipment. This does not apply when the depth exceeds fifty meters and in both cases it is desirable to reduce sub-sea operations.

A second difficulty arises from the fact that the sea-bed can assume different forms, the very nature of the sea-bed being variable and comprising partly a very thick sandy layer, and partly a thin sandy layer, the remainder of the bed consisting, for example, of rock.

A third difficulty encountered in certain areas of the world and more particularly in the Middle East arises from the fact that pipeline systems are likely to interact. It is important therefore that two pipelines do not come into contact with one another at the point of intersection.

Regarding this third difficulty, it has been proposed in U.S. Pat. No. 3,861,158 to interpose at the point of intersection between lower and upper submerged pipelines, a structure made of elastomeric material which envelops the lower pipeline and on which the upper pipeline is supported. This structure comprises means for introducing a cement, capable of setting, into the pouch formed, which allows the shape of the said structure to be at least partially determined. Moreover, this structure is anchored to the sea-bed and equipped with means for securing the upper pipeline. However, when there is a strong current, the large surface area of these structures is subjected to considerable pressures, and this tends to displace and deform the assembly of the two pipelines.

For the purpose of overcoming the irregularities of the ground in the case of a pipeline constructed on land, U.S. Pat. No. 3,734,138 proposes placing the pipeline on pillar supports, each of which consists of a bag made of rubber or similar material and filled with a fluid material, such as styrene foam, sand or the like. Taking into account the elasticity of the bag into which a filling agent is introduced, the pillar supports can follow perfectly the irregularities of the ground. Moreover, the large surface area of the bags allows them to hold the pipeline when they are filled with low density materials, even if the ground becomes muddy.

These devices do not permit firm anchorage, in the ground, which can hold pipelines in opposition to the force of the different currents which may be exerted thereon. Moreover, it is known that when pipelines are laid, they are submerged along an approximately predetermined line without it being known exactly on what type of ground the pipeline will finally be supported. It is therefore desirable to provide means for ensuring anchorage irrespective of the nature of the ground, even if another pipeline has already been laid at one point on the length of the new pipeline.

The present invention aims to solve this problem and to provide a solution which minimizes the number of operations to be performed, while ensuring proper anchorage of the pipeline to the ground.

According to one aspect of the invention, a method of anchoring a line, such as a pipeline, to a support, comprises the steps, at each anchoring point, of drilling holes on both sides of the line, bedding piles in said holes, passing at least one saddle clamp around the line, securing the ends of said saddle clamp to said piles, and injecting a filling material into an inflatable body arranged between the line and said saddle clamp.

According to another aspect of the invention, a device for putting into practice the method of the invention, comprises a saddle clamp, means for securing the saddle clamp to said piles, and an inflatable body, in the form of a bag or pouch, having a wall which is attached to the saddle clamp and provided with a valve for injecting said filling material into the inflatable body.

The invention will now be described, by way of example, with reference to the accompanying drawings, in which FIG. 1 is a sectional view through a transverse plane of a pipeline anchored to a sea-bed by a first embodiment of a device according to the invention, FIGS. 2 and 3 are diagrammatic sectional views taken along the line III—III of FIG. 3 showing, respectively, an empty inflatable bag and a filled inflatable bag, FIG. 4 is a perspective view of a pipeline anchored to a sea-bed by a second embodiment of a device according to the invention, FIG. 5 is a sectional view through a transverse plane of a pipeline anchored on a rocky sea-bed covered by a relatively thin layer of sand, employing a third embodiment of a device according to the invention, FIG. 6 is a perspective view of a pipeline anchored to a sea-bed by a fourth embodiment of a device according to the invention, FIG. 7 is a transverse sectional view of the device of FIG. 6, FIGS. 8 to 13 are schematic transverse sectional vie views of a pipeline showing stages of anchoring the pipeline by the method according to the invention, and positions adopted by the pipeline and its anchoring device in the course of time, FIG. 15 is a perspective view showing the intersection of two pipelines and their method of anchorage according to the invention, FIG. 16 is a sectional view corresponding to FIG. 15, FIG. 17 is a transverse sectional view of a pipeline anchored to a sea-bed by a further embodiment of a device according to the invention, FIG. 18 is a perspective view showing the intersection of two pipelines, in which the upper pipeline is supported by a set of anchoring devices according to the invention, and FIG. 19 is a sectional view corresponding to FIG. 18.

As previously mentioned, the nature of a sea-bed can vary and the embodiments illustrated in FIGS. 1 to 4 refer to cases where the bed is of a stable nature, a case which is encountered, for example, on level stretches of rock. In FIG. 1, the reference numeral 1 designates a firm sea-bed, and reference numeral 2 a pipe made of steel, for example, and provided with a concrete coating 2a. Arranged around the pipe 2 is a saddle clamp 3 formed by a metallic, particularly steel, strip component comprising a central part 3a curved along a radius slightly greater than the external semi-diameter of the pipe 2, 2a, two straight or substantially straight parts 3b1 and 3b2, and two ends 3c1 and 3c2 bent outwardly from the straight parts 3b1, 3b2 so as to be substantially parallel to the bed 1. Secured in the concave section of the saddle clamp 3, and particularly in its central part 3a, is one of the walls 4a of an inflatable body 4 which, in this embodiment, is in the form of a pouch, the lateral folds of which extend in a curvilinear direction substantially parallel to the incurved part 3a of the saddle clamp 3. The walls of this pouch are formed of a flexible, extensible or non-extensible material and their outer surfaces are at least partially made of a material that is highly resistant to sea water. This can be, for example, an appropriate synthetic material or rubber material. Means 5 are shown in FIGS. 2 and 3 for securing the inflatable body 4 of the concave part 3a of the saddle clamp. The choice of material for the means 5 is optional; for example, they can be small layers of a suitable adhesive, water-tight rivets, etc. As shown in FIG. 1, the inflatable body 4 secured in the concave section of the saddle clamp 3 extends at least partially over its curved central part 3a and preferably over the entire length of this central part 3a, one of its ends being provided with a valve 4b for injecting therein a settable material, for example a cement filling.

The device shown in FIGS. 1 to 3 is used in the following manner:

After the various pipeline components 2, 2a have been assembled and laid on the sea-bed 1 by known means not necessitating description, a special machine (not shown) resting on the sea-bed 1 proceeds with the drilling of pairs of anchorage holes 11, 12 on either side of the pipeline and at appropriate places, and with providing the inner walls of these holes with a thin layer of cement. Each saddle clamp 3 is then lowered from a barge on the surface and guided in such a manner that its curved central part 3a straddles the pipe 2, 2a without there being any contact between the latter and the lower wall 4c of the inflatable body 4 which at this time is empty, as shown in FIG. 2. The saddle clamp is therefore supported on the sea-bed 1 by its ends 3c1 and 3c2 which are arranged in such a way that the wide openings they possess lie over the holes 11, 12. Piles 21, 22, particularly steel tubes, near the upper ends of which collars 31 and 32 are welded, are then driven, by their lower ends, into the aforementioned openings in the ends 3c1 and 3c2 of the saddle clamp 3, and are then driven into the holes 11, 12 until the collars 31, 32 clamp the ends 3c1 and 3c2 of the saddle clamp tightly against the bed 1. The setting of the cement interposed between the inner walls of the holes 11, 12 and the corresponding piles 21, 22 ensures the final anchorage of the piles. The only manual operation which the diver then needs to carry out is to connect the nozzle of a grout injection pipe (not shown) to the injection valve 4b of the inflatable body 4, the other end of this injection pipe being connected to a known type of injection apparatus on the barge. It is notable that this single manual operation does not require any severe physical effort, nor even any particular care, in the part of the diver and, moreover, is performed very rapidly. The grout injected through the valve 4b causes inflation of the inflatable body 4, the lower wall 4c of which is then pressed against the outer wall of the pipe 2, 2a, as shown in FIG. 3. From this moment, the pipe 2, 2a is tightly clamped by the saddle clamp 3 against the sea-bed 1 and this clamping action is rendered permanent by the grount solidifying inside the body 4.

FIG. 4 illustrates another embodiment also intended for the laying of lines on a hard and firm sea-bed. In this embodiment, the piles 21 and 22 are anchored, in the ground, in holes 11 and 12 which, as above, have been drilled and cemented, the saddle clamp 3 then being guided into position on the upper part of the line by engagement of brackets 13 on the clamp with the piles. When the saddle clamp 3 is supported on the line 2, counterflanges 14 are bolted to the brackets 13, and then inflation of the bag 4 with a suitable material is initiated. Thus it is certain that the line will resist all currents insofar as inflation of the bag permits the line 2 to be permanently pressed and held against the sea-bed 1.

When the sea-bed is formed by a thick sandy layer, it is possible for the line to be buried completely after the digging of a trench, once buried, the line is unaffected by currents on the sea-bed. However, one case which occurs relatively frequently is the presence of a sandy layer of several decimeters thickness over a rocky bed. The solution proposed using the devices of FIGS. 1 to 4 is therefore inapplicable. Indeed, when a pipeline is resting on sand, permanent erosion occurs under the effect of the swell or of various currents. Therefore the pipeline moves down in the course of time and under the effect of its own weight and is no longer properly held by the anchoring device. It is essential that the pipeline is firmly and permanently held, since the lateral forces to be absorbed by an anchorage can reach 10 tons, for example, the lateral stresses frequently exceeding the friction of the line on the sea-bed. In such a situation the device shown in FIG. 5 may be employed.

In FIG. 5, the pipeline 2, 2a is supported on a sea-bed consisting of a layer 1 of sand which in turn lies on a level stretch of rock 1a. As in the previous embodiments piles, such as the pile 21, are driven into cemented holes, such as the hole 11, but in this case the piles themselves are filled with cement 11a. As before, collars, such as the collar 31, are formed integrally with the saddle clamp 3, but it will be noted that this saddle clamp extends below the diametrical line of the pipeline, and indeed it is necessary for the saddle clamp and the pipeline to be firmly fixed together in the vertically downward direction. The collar 31 is secured, for example welded, substantially along the diameter of the line 2, 2a. In this embodiment, the collar 31 is equipped with unidirectional non-return means, generally designated by the reference numeral 33. The latter consists of two dogs 34 articulated about shafts 35 mounted in a fork. The collar 31 comprises an oblong opening for facilitating the positioning of the collar around the pile 21, which is bedded into the rock 1a. The dogs 34 can pivot upwardly, which allows the collar 31 to move down on the pile 21. On the other hand, when the dogs 34 are in contact with the pile 21, they are prevented from making any downward pivoting movement in view of the shape of the dogs.

The method of using the device of FIG. 5 is an follows:

After drilling the holes 11 and bedding in the piles 21, the saddle clamp 3 with its two collars 31 is passed over two of the piles. The bag 4 is then filled, as before, with a grouting of cement or any other suitable material which, during its hardening, ensures rigid interlocking of the saddle 3 and the line 2, 2a, which line is thus locked, as it were, inside the saddle clamp. The action of the dogs 34 therefore opposes any upward movement of the line while permitting its downward movement. The line 2, 2a therefore remains pressed against the sea-bed even when the sand below the line drifts in other direction. Moreover, it will be noted that the flexibility of the saddle clamps makes it possible to compensate for any possible slight deformations or the damp vibrations. The operation of extracting the sandy layer, which is always difficult and consequently costly, is therefore avoided by the device of FIG. 5.

FIGS. 6 and 7 show a modified embodiment of the device of FIG. 5, in which a single part 34 ensures the non-return action. The previously used reference numerals have been retained and it can be seen that the collar 31 of FIG. 5 is replaced by two vertical, spaced-apart plates 31a and 31b which are welded to the saddle clamp 3 and are inter-connected by stay bolts 36 which act as guide pins.

FIGS. 8 to 13 are diagrams illustrating the various stages of positioning an anchoring device by the method of the invention, and positions it adopts in subsequent operation. FIG. 8 shows the pipeline 2 between two piles 21 and 22 which are bedded in the ground 1. The following operation is illustrated in FIG. 9 in which the saddle clamp 3 and its collars 31, 32 are slipped over the piles 21, 22 until the saddle clamp 3 is resting on the line 2. The non-return means or dogs 34 are hanging freely on their shafts.

In the subsequent stage, which is illustrated in FIG. 10, two guide pins 36 are introduced into their openings and each dog 34 is rotated into a locking position in which it bears against a respective one of the piles. FIG. 11 illustrates the following operation during which the pouch or bag 4 is filled with a settable material, such as, for example, cement or an epoxy resin. In the course of this operation, the settable material can be introduced under pressure so as to test the strength of the piles and ensure that they are properly anchored in the ground. Then the pressure is reduced to the setting pressure.

In FIG. 12 the device is in an operational position and all the vertical and horizontal loads are transmitted directly to the piles and thence to the foundation without inducing any stress in the line. As shown in FIG. 13, when the ground is eroded the pipeline settles under the effect of its own weight, drawing the saddle clamp 3 down with it, and the entire system moves from the position shown in chain lines to the position shown in full lines so that the line remains firmly held at all times.

FIGS. 14 to 19 relate more particularly to the solving of problems resulting from surface irregularities on the sea-bed.

FIG. 14 illustrates an embodiment in which the line 2, 2a is supported by saddle clamps, one only of which is shown, this saddle clamp 3 being secured on either side of the line to piles 21 and 22 anchored in the ground and bedded in drill holes. The saddle clamp 3 preferably envelops three-quarters of the periphery of the line 2, 2a so as to hold it against forces exerted in a downward vertical direction as well as against forces having a tendency to lift the line. As before, a pouch or bag 4 is provided inside the saddle clamp and can be rigidly fixed thereto in order to achieve locking of the saddle clamp to the line. The saddle clamp 3 is mechanically connected to the piles 21 and 22 by flanges 13 and counterflanges which can be bolted or riveted. The method of fitting this anchoring device will be referred to hereinafter for it is quite obvious that it is not always an easy operation to pass the saddle clamp under a pipeline.

In FIG. 15 a lower pipeline 2 is supported on and anchored to the sea-bed 1 before a second pipeline 200 is placed in position. Before the second pipeline 200 is positioned, the pipeline is preferably anchored in the manner previously described with reference to FIGS. 1 to 3. The four piles 21, 22, 21a and 22a are preferably arranged in a quadrilateral formation surrounding both the pipeline 2 and the pipeline 200. In this embodiment the drill holes (not shown) are deeper than before and the piles 21, 22, 21a and 22a project upwardly from the ground by a greater distance than before. Indeed, these piles serve not only to anchor the anchor pipeline 2 but also to anchor the upper pipeline 200 which in FIG. 15 crosses over the lower pipeline in a direction substantially at right angles, but which could, if necessary, cross over the lower pipeline in any direction, the anchorages of the two pipelines therefore becoming independent from one another. For this purpose two saddle clamps 3a having an upwardly curved concave shape are arranged parallel to the direction of the lower pipeline 2 so as to form a kind of cradle for the upper pipeline 200. As before, the lower parts of the saddle clamps 3a comprise an inflatable bag or pouch 4 which can be filled with a pressurised curable fluid. Injection of the grouting into the inflatable bag 4 makes it very easy to achieve a jacking effect. Consequently, the pipeline 200 can be lifted very easily since it is known that the applied force is equal to the product of the pressure by the surface area on which this pressure is exerted, and since the contact surface between the inflatable bag 4 and the pipeline 200 is well defined. Therefore, in order to obtain the desired force it is sufficient to introduce the curable grouting product into the diaphragm 4 under a predetermined pressure.

In FIG. 15 the two pipelines 2 and 200 are shown in the anchored position. To achieve this result the following procedure is adopted:

Girders P shown in chain-dotted lines in the Figure are arranged on either side of the pipeline 2 in the area where the pipeline 200 is submerged in order that in a first stage this pipeline is supported on the girders P, the height of which is greater than the diameter of the pipeline 2. The presence of these girders prevents any possibility of the pipeline 200 bearing on the pipeline 2. The saddle clamps are therefore passed under the line 200 and slipped over the piles 21, 22 and 21a, 22a, respectively. Straps 38 can be arranged above the line 200 in order to hold it in opposition to the stresses which would tend to lift the line, the straps 38 being bolted to the piles by nuts 37. After the saddle clamps 3a are secured on the four piles, inflation of the bags 4 is initiated to raise the pipeline 200 relative to the girders P. The latter can then be withdrawn since they are no longer in contact with the pipeline 200.

FIG. 16 is a section through a vertical plane perpendicular to the pipeline 200, showing the positions of the different elements relative to one another.

FIG. 17 shows another method of pipeline anchoring based on the same principle, that is to say, two saddle clamps 3 arranged opposite one another are secured on two piles 21 and 22 by collars 31. As before, inflatable pouches or bags 4 are interposed between the concrete coating 2a of the line 2 and the saddle clamps 3. Nuts 37 lock the entire system in a vertical position.

FIGS. 18 and 19 illustrate an alternative method of arranging the point of pipeline intersection, wherein the two pipelines are anchored independently of one another. In these Figures the same reference numerals designate the same elements, that is to say the pipeline 2 must pass under the pipeline 200. The pipeline 2 is anchored in the ground, in the vicinity of the intersection, by two saddle clamps 3 inside which inflatable pouches or bags 4 are fixed. Moreover, the pipeline 200 is anchored to the sea-bed by a number of devices each comprising a saddle clamp 3, with an upwardly or downwardly curved concavity, supported on or simply fixed to the piles 21, 22. In all cases an inflatable body is interposed between the saddle clamp and the line. In the case of saddle clamps with an upward concavity, the jacking effect allowing the pipeline to be raised slightly is identical to that mentioned previously. The pipeline 200 can be locked in position on its supports 39 with an upwardly curved concavity by straps 38 screwed onto the piles 21 and 22 by nuts 37. It will be noted that by controlling the height of the piles and fitting the pipeline more or less by inflation of the bag, it is possible to compensate for the irregularities of the terrain in such a way that the profile of the pipeline is adjusted along an appropriate length.

Obviously, when a hard and firm bed occurs beyond the points of intersection, it is preferably to use an anchorage of the type described with reference to FIGS. 1 and 4 and, in a case where a firm bed is covered by a thin layer of sand, the anchorage described with reference to FIG. 5 can be used. When there is a sufficiently thick layer of sand, the pipeline can be buried in a trench.

The present invention therefore makes it possible to ensure anchorage of lines, such as pipelines, independently of the nature of the ground on which these pipelines are laid and even when lines intersect. It is obvious that the present invention is not limited in any way to the embodiments just described and illustrated. For this reason reference has been made to the solidification of the product injected into the inflatable body. This solidification is however optional and the filling material could conveniently be left permanently in its paste or even liquid form. The filling material may be one of the known materials which inflates, for example as the result of a chemical reaction or the action of a suitable agent. The use of a mass of this type of inflatable material, the inflation of which gives rise to a solid and possibly porous product, can also be envisaged in the case of the present invention. Obviously the method and devices just described can be used to secure any pipe to any support, a concrete support for example, or even on land. At all events work which is difficult to carry out on the sea-bed (clamping, foundation work, etc.) is minimised since the injection of cement grouting or other solidifiable materials is a very easy operation and the collars can be automatically clamped to the piles. Moreover, the introduction of a material in a pressurised fluid form permits, on the one hand, the strength of the piles to be tested by applying an excess pressure in a first stage, which constitutes a distinct advantage taking into account the difficult conditions for pipeline maintenance. The buoyancy or lateral thrust tests on the piles can be carried out during the normal installation procedure without time being wasted.

What is claimed is:

1. A method of anchoring a line, such as a pipeline, to a support, in particular a sea bed, including the steps at each anchoring point, of:
   drilling anchorage holes in said support on both sides of the line;
   bedding piles in said holes;
   passing a central curved part of at least one saddle clamp having lateral connecting parts around at least a portion of the periphery of the line and arranging an inflatable body in its deflated state between the line and said curved part of each said saddle clamp;
   securing said lateral connecting parts of said saddle clamp to said piles; and
   injecting a filling material into said inflatable body to provide a jacking effect displacing the line, with respect to said support, piles and saddle clamp, to its anchored position.

2. A method as claimed in claim 1, of anchoring a first line at a certain height above said support, in particular at a crossing point of said first line with at least a second line laid under said first line, further including the steps of:
   laying said first line on bearing structures positioned on both sides of the zone where said first line is to be anchored at said height, in particular on both sides of said second line at said crossing point, the height of said structures being superior to the external diameter of said second line;
   passing under said first line said central curved part of said saddle clamp, the concavity of which is directed upwardly; and
   forcing said first line upwards with respect to said support, piles, saddle clamp and bearing structures by the injection of said filling material into said inflatable body.

3. A method as claimed in claim 2, further including the step of withdrawing said bearing structures.

4. A method as claimed in claim 2, further including, after the step of forcing said first line upwards in its anchored position, the steps of passing at least a strap over said first line for each saddle clamp; and
   securing said strap to said piles to which said lateral connecting parts of said corresponding saddle clamp are secured.

5. A method as claimed in claim 2, further including the steps of:
   passing over said first line, in opposition to each said saddle clamp, the central curved part of another saddle clamp, the concavity of which is directed downwardly, said other saddle clamp having also lateral connecting parts, and arranging another inflatable body in its deflated state between said first line and said curved part of said other saddle clamp;
   securing said lateral connecting means of said other saddle clamp to said piles; and
   injecting a filling material into said other inflatable body to firmly interlock said first line between the two saddle clamps in opposition.

6. A method as claimed in claim 1 further including the steps of:
   injecting said filling material into said inflatable body at an excess pressure in a first stage, so as to test the strength of said piles and ensure that they are properly anchored in the support; and
   reducing the pressure to an anchoring pressure.

7. A method as claimed in claim 1, wherein said filling material is a settable material.

8. A method as claimed in claim 1, wherein said central curved part of said saddle clamp is disposed toward said support and the jacking effect urges the line toward said support.

9. A method as claimed in claim 1, wherein said central curved part of said saddle clamp is disposed away from said support.

10. A method as claimed in claim 1, wherein said central curved part of said saddle clamp and said inflatable body extend more than half way around the periphery of said line to insure rigid interlocking of said line and said saddle clamp after said inflatable body has been filled.

11. A device for anchoring a line, such as pipeline, to a support, in particular a sea bed, including, for each anchoring point;
- a pair of piles, to be embedded in anchorage holes drilled in said support on both sides of said line;
- at least a saddle clamp having a central curved part and lateral connecting parts for securing said saddle clamp to said piles; and
- at least an inflatable body, secured in the concavity of said central curved part of each said saddle clamp by securing means, and the walls of which are formed of flexible material, said inflatable body being provided with a valve for injecting a filling material into said body.

12. A device as in claim 11, wherein each inflatable body is filled with a settable material like cement.

13. A device as in claim 11, wherein said lateral connecting parts each cooperates with a collar rigidly fixed to one of said piles and clamping said corresponding connecting part against said support when said pile is embedded in one of said holes.

14. A device as in claim 11, wherein said lateral connecting parts include brackets engageable with said piles and to which counterflanges are bolted to secure said saddle clamp to said piles embedded in said holes.

15. A device as in claim 11, wherein said central curved part of each said saddle clamp and each said corresponding inflatable body extend more than half way round the periphery of said line, to ensure rigid interlocking of said line and said saddle clamp after said inflatable body has been filled.

16. A device as in claim 15, wherein said lateral connecting parts each includes a non-return means for unidirectional slidably mounting on said corresponding pile.

17. A device as in claim 16, wherein said unidirectional non-return means each includes a collar, slidable on said corresponding pile, two dogs mounted on said collar, one of said dogs at least being pivotally mounted about an axis substantially perpendicular to said corresponding pile, and pressed against said corresponding pile to oppose any movement of said line in one direction while permitting movement in the other direction.

18. A device as in claim 17, wherein said unidirectional non-return means each includes two spaced-apart plates, substantially parallel to said corresponding pile in their cooperation position, and inter-connected by at least one guide pin for said corresponding pile, and a single dog pivotally mounted between said two plates about an axis substantially perpendicular to said corresponding pile and rotatable into a locking position in which it bears against said corresponding pile to oppose any movement of said line in one direction while permitting movement in the other direction.

19. A device as in claim 11, wherein said saddle clamp has its concavity directed upwardly and is suspended by its lateral connecting parts from the upper ends of said two piles and fixed thereto.

20. A device as in claim 19, further including a strap for passing over said line and for being fixed to said upper ends of said two piles.

21. A device as in claim 11, including two said saddle clamps with respectively upwardly and downwardly directed concavities to be fixed in opposition by their respective lateral connecting parts on said two piles, in such a manner as to completely surround said line.

22. A device as in claim 11, wherein two pairs of said saddle clamps are fixed on four piles, two of said saddle clamps having a downwardly directed concavity for holding a first line against said support and the other two of said saddle clamps having an upwardly directed concavity for holding a second line which passes over the first line.

23. A device as in claim 11, wherein said saddle clamp has its concavity directed toward said support.

* * * * *